US009489250B2

(12) United States Patent
Raja Rao

(10) Patent No.: US 9,489,250 B2
(45) Date of Patent: Nov. 8, 2016

(54) SYSTEM AND METHOD FOR MANAGING A NETWORK INFRASTRUCTURE USING A MOBILE DEVICE

(75) Inventor: Arun Gautham Raja Rao, Bangalore (IN)

(73) Assignee: Infosys Limited, Bangalore (IN)

(*) Notice: Subject to any disclaimer, the term of this patent is extended or adjusted under 35 U.S.C. 154(b) by 748 days.

(21) Appl. No.: 13/601,463

(22) Filed: Aug. 31, 2012

(65) Prior Publication Data

US 2013/0061085 A1 Mar. 7, 2013

(30) Foreign Application Priority Data

Sep. 5, 2011 (IN) .......................... 3047/CHE/2011

(51) Int. Cl.
| | | |
|---|---|---|
| *G06F 11/00* | (2006.01) | |
| *G06F 12/14* | (2006.01) | |
| *G06F 12/16* | (2006.01) | |
| *G06F 15/16* | (2006.01) | |
| *G06F 15/18* | (2006.01) | |
| *G06F 17/00* | (2006.01) | |
| *G06F 3/048* | (2013.01) | |
| *G06F 9/00* | (2006.01) | |

(Continued)

(52) U.S. Cl.
CPC ........... *G06F 11/079* (2013.01); *G06F 3/0481* (2013.01); *G06F 3/04895* (2013.01); *G06F 9/45512* (2013.01); *H04L 63/1408* (2013.01); *H04L 63/1441* (2013.01); *H04L 63/20* (2013.01); *H04M 1/72533* (2013.01); *H04M 11/007* (2013.01)

(58) Field of Classification Search
CPC ............. G06F 3/0481; G06F 3/04895; G06F 9/45512; H04L 63/1408; H04L 63/1441; H04L 63/20; H04M 11/007; H04M 1/72533
See application file for complete search history.

(56) References Cited

U.S. PATENT DOCUMENTS 6,073,101 A * 6/2000 Maes ............................ 704/275
6,144,848 A * 11/2000 Walsh ...................... G06K 7/10
235/379

(Continued)

OTHER PUBLICATIONS

Ozeki Informatics, "Send and receive SMS from your Network management system," Last accessed Aug. 23, 2012, (http://www1.sms-integration.com/p_47-network-managment-sms.html).

(Continued)

*Primary Examiner* — Nicholas Taylor
*Assistant Examiner* — Ho Shiu
(74) *Attorney, Agent, or Firm* — LeClairRyan, a Professional Corporation

(57) ABSTRACT

A system and method for managing an IT infrastructure using a mobile device, the method comprises identifying, using one or more processors of a network management system, an issue in one or more components in the infrastructure; retrieving a message instruction for the identified issue from an action database, wherein the message instruction includes information identifying a support personnel and a mobile device of the support personnel to contact regarding the identified issue; sending an alert message to the mobile device of the identified support personnel, wherein the alert message contains information of the identified issue; receiving, at the network management system, a reply message from the mobile device, wherein the reply message contains an instruction to resolve the identified issue; generating an executable command corresponding to the instruction in the reply message; and executing the executable command on the affected components in the infrastructure to resolve the identified issue.

18 Claims, 4 Drawing Sheets

(51) Int. Cl.
*G08B 23/00* (2006.01)
*H04M 1/66* (2006.01)
*H04M 3/00* (2006.01)
*G06F 11/07* (2006.01)
*G06F 3/0489* (2013.01)
*H04L 29/06* (2006.01)
*H04M 1/725* (2006.01)
*G06F 3/0481* (2013.01)
*G06F 9/455* (2006.01)
*H04M 11/00* (2006.01)

(56) References Cited

U.S. PATENT DOCUMENTS

| | | | | |
|---|---|---|---|---|
| 6,574,656 | B1* | 6/2003 | Nagaoka et al. | 709/201 |
| 6,741,855 | B1* | 5/2004 | Martin | H04L 12/5895 455/412.1 |
| 2003/0084056 | A1* | 5/2003 | DeAnna et al. | 707/100 |
| 2003/0187993 | A1* | 10/2003 | Ribot | 709/227 |
| 2005/0195660 | A1* | 9/2005 | Kavuri | G06F 3/0605 365/189.05 |
| 2005/0234988 | A1 | 10/2005 | Messick | |
| 2006/0053094 | A1 | 3/2006 | Ravi et al. | |
| 2006/0224761 | A1* | 10/2006 | Howarth | H04N 21/235 709/231 |
| 2007/0039047 | A1* | 2/2007 | Chen et al. | 726/22 |
| 2007/0118558 | A1* | 5/2007 | Kahandaliyanage | 707/104.1 |
| 2007/0124305 | A1* | 5/2007 | Smith et al. | 707/10 |
| 2007/0191035 | A1* | 8/2007 | Huggett | 455/466 |
| 2007/0237318 | A1* | 10/2007 | McGary | 379/114.15 |
| 2008/0005312 | A1* | 1/2008 | Boss et al. | 709/224 |
| 2008/0160960 | A1* | 7/2008 | ElRif et al. | 455/411 |
| 2008/0305815 | A1* | 12/2008 | McDonough | 455/466 |
| 2008/0313255 | A1* | 12/2008 | Geltner | H04L 12/2859 709/201 |
| 2009/0124271 | A1* | 5/2009 | Roundtree | H04M 1/72552 455/466 |
| 2011/0099412 | A1* | 4/2011 | Chan et al. | 714/2 |
| 2012/0192096 | A1* | 7/2012 | Bowman | G06F 3/0481 715/780 |

OTHER PUBLICATIONS

Wavelink Corporation, "Mobile device and WLAN management from wavelink avalanche," Last accessed Aug. 23, 2012, (http://www.wavelink.com/p/mobile-device-and-infrastructure-management_features).

Whatsup Gold, "Network Management in the Palm of Your Hand," IP Switch, Last accessed Aug. 23, 2012, (http://www.whatsupgold.com/technology/network-management/mobile-access/).

* cited by examiner

SYSTEM AND METHOD FOR MANAGING A NETWORK INFRASTRUCTURE USING A MOBILE DEVICE

RELATED APPLICATION

The present application claims the benefit of priority under 35 U.S.C. 119 to Indian Patent Application Serial No. 3047/CHE/2011, filed Sep. 5, 2011, and entitled "System And Method For Managing A Network Infrastructure Using A Mobile Device", all commonly owned herewith.

FIELD

The present disclosure relates to a system and method for managing network infrastructure using a mobile device.

BACKGROUND

Organizations or enterprises utilize an IT Infrastructure which includes servers, applications, databases, middleware, etc. as a critical aspect of their business. The hardware and software components of the IT infrastructure require constant attention of one or more support persons, such as network administrators, to ensure smooth operation of the organization's IT system. As the IT infrastructure has evolved, many tools have been developed to allow support persons to easily monitor various elements of the infrastructure, report critical errors and take corrective actions. However, existing systems require the support person to access a workstation, laptop, or server to access these tools or to take corrective actions. At present there is only a concept of alerting the support person via the person's mobile device of a problem in the IT infrastructure. However, existing systems do not allow the support personnel to provide instructions via his mobile device which are then executed in the IT infrastructure.

What is needed is a system and method for managing a network infrastructure using a mobile device.

SUMMARY

In an aspect, a method of managing an IT infrastructure using a mobile device is disclosed. The method comprises identifying, using one or more processors of a network management system, an issue in one or more affected components in the network infrastructure. The method comprises retrieving, using the one or more processors, a message instruction for the identified issue from an action database, wherein the message instruction includes information identifying a support personnel and a mobile device of the support personnel to contact regarding the identified issue. The method comprises sending, using the one or more processors, an alert message to the mobile device of the identified support personnel, wherein the alert message contains information of the identified issue. The method comprises receiving, at the network management system, a reply message from the mobile device, wherein the reply message contains an instruction to resolve the identified issue. The method comprises generating, using the one or more processors, an executable command corresponding to the instruction in the reply message. The method comprises executing the executable command on the one or more affected components in the IT network infrastructure to resolve the identified issue.

In an aspect, a non-transitory computer readable storage medium having stored thereon instructions for managing an IT network infrastructure using a mobile device. The medium comprises computer executable code which when executed by at least one machine, causes the machine to identify an issue in one or more affected components in the network infrastructure. The machine is configured to retrieve a message instruction for the identified issue from an action database, wherein the message instruction includes information identifying a support personnel and a mobile device of the support personnel to contact regarding the identified issue. The machine is configured to send an alert message to the mobile device of the identified support personnel, wherein the alert message contains information of the identified issue. The machine is configured to receive a reply message from the mobile device, wherein the reply message contains an instruction to resolve the identified issue. The machine is configured to generate an executable command corresponding to the instruction in the reply message. The machine is configured to execute the executable command on the one or more affected components in the IT network infrastructure to resolve the identified issue.

In an aspect, a network management system includes at least one network management device comprising: a network interface configured to allow communications with at least one database and at least one mobile network; a memory; a processor coupled to the network interface and the memory. The processor is operative to identify an issue in one or more affected components in the network infrastructure. The processor is operative to retrieve a message instruction for the identified issue from an action database, wherein the message instruction includes information identifying a support personnel and a mobile device of the support personnel to contact regarding the identified issue. The processor is operative to send an alert message to the mobile device of the identified support personnel, wherein the alert message contains information of the identified issue. The processor is operative to receive a reply message from the mobile device, wherein the reply message contains an instruction to resolve the identified issue. The processor is operative to generate an executable command corresponding to the instruction in the reply message. The processor is operative to execute the executable command on the one or more affected components in the IT network infrastructure to resolve the identified issue.

In one or more above aspects, the message sent to the mobile device is routed through one or more SMSC components. A processor of the one or more SMSC components implements executable instructions in a SMSC memory wherein the processor of the one or more SMSC components is configured to transmit the message from the one or more SMSC components to the mobile device. The reply message is received from the replying mobile device at the one or more SMSC components. A first security check is performed on the reply message to verify whether a MSISDN address of the replying mobile device is in a set of accepted MSISDN addresses stored on the one or more SMSC components. The reply message is sent from the one or more SMSC components to the network management device upon verifying the MSISDN address of the replying mobile device.

In one or more above aspects, a second security check is performed on the reply message, wherein the second security check comprises verifying that the contact information of the replying mobile device matches the contact information of the identified support personnel.

In one or more above aspects, a third security check is performed on the reply message, wherein the third security check comprises accessing policy information of the identified support personnel and verifying that the instruction in the reply message complies with the policy information of the identified support personnel.

In one or more above aspects, the mobile device is configured to include a processor configured to implement executable instructions in a memory wherein the processor implements a mobile application configured to communicate with the network management device, wherein the mobile application converts the message into form that allows the contents of the message to be displayable to the support personnel on the mobile device via a user interface.

In one or more above aspects, if the mobile device does not support applications then basic SMS short codes will be used to interact with the network management system.

In one or more above aspects, the processor on the network management device is configured to determine whether the issue is resolved after executable command is executed; and send another message to the one or more support personnel if the issue is not resolved.

DETAILED DESCRIPTION

In general, a system and method for managing network infrastructure using a mobile device is disclosed. In general, the system and method utilizes a message-based network management system which monitors one or more hardware and/or software components in an IT infrastructure. The network management system alerts one or more support persons when an issue or problem occurs in the infrastructure by sending a message to the support person's mobile device. The network management system allows the support person to attempt to resolve the problem by placing one or more instructions in a reply message using his/her mobile device, whereby the instructions are sent back to the network management system in the reply message. The network management system is able to process the reply message and execute a command which corresponds to the support person's instructions to resolve the issue in the IT infrastructure. The network management system serves a long felt need to reduce costs and achieve faster response times to problems which occur in the IT infrastructure.

Figure 1:
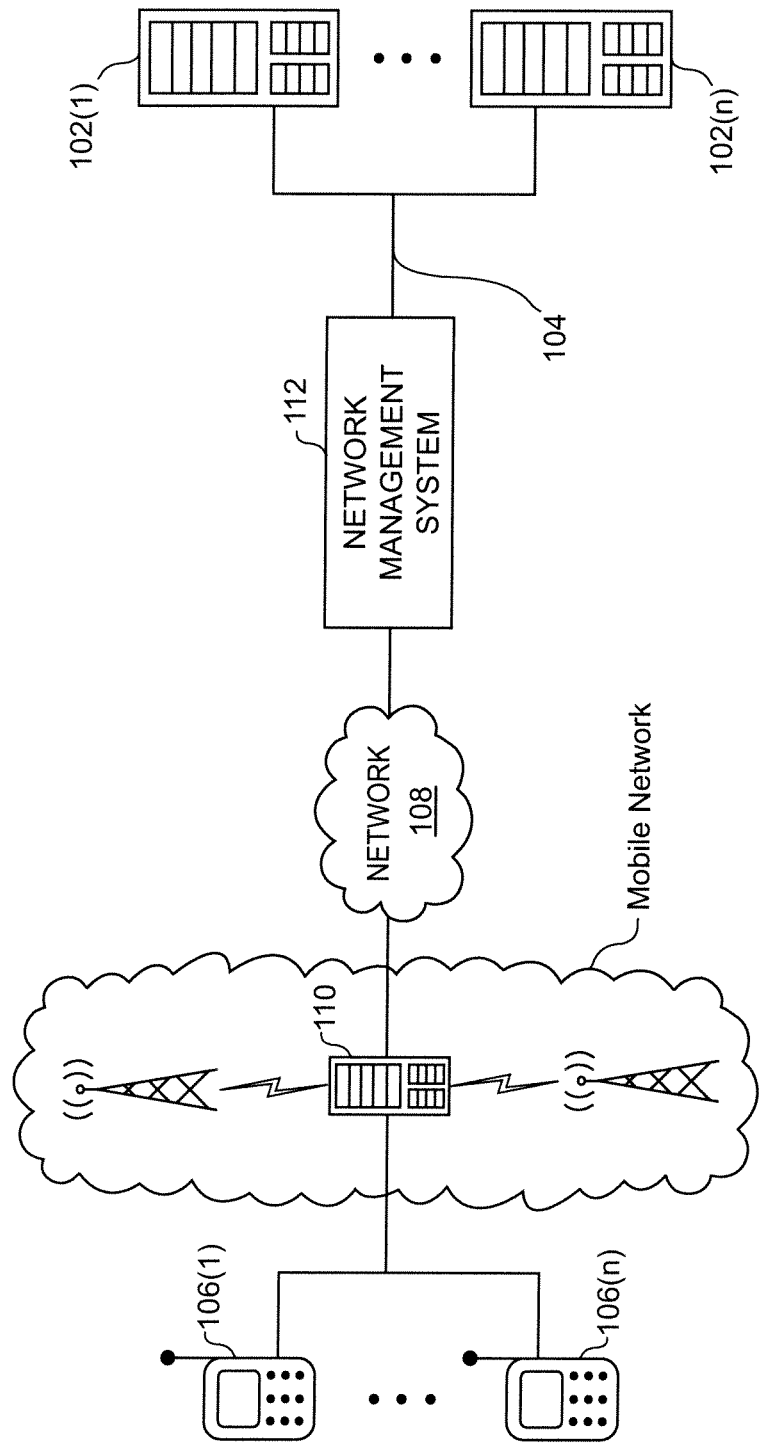
FIG. 1 illustrates a diagram of an example system environment that utilizes a message-based network management system in accordance with an aspect of the present disclosure.

FIG. 1 illustrates a diagram of an example system environment that implements and executes a novel message-based infrastructure management system and method in accordance with an aspect of the present disclosure. In particular, the example system environment 100 includes a plurality of network devices. It should be noted that the term "network devices" can be referred to as encompassing one or more mobile client devices, one or more servers, mobile network devices, virtual machines, cloud computing devices and/or other components in the system 100.

The network system 100 includes one or more components in an IT infrastructure 102'. These network devices may include servers 102(1)-102(n) including but not limited to application servers, database servers, computation farms, data centers, virtual machines, cloud computing devices, mail or web servers and the like. The network system 100 includes one or more mobile client devices 106(1)-106(n), although the environment 100 could include other numbers and types of devices in other arrangements. As shown in FIG. 1A, the environment 100 includes one or more SMSC components 110 which communicate with the one or more mobile devices 106(1)-106(n) via mobile cell towers (111). Additionally, the network system 100 includes a message-based network management system 112 interposed between the network 108 and the IT infrastructure 102'.

The servers 102(1)-102(n) are connected to a local area network (LAN) 104 and the mobile client devices 106(1)-106(n) are connected to a wide area network 108. The servers 102(1)-102(n) comprise one or more network devices or machines capable of operating one or more Web-based and/or non Web-based applications that may be accessed by other network devices (e.g. mobile client devices, other servers) via the network 108. One or more servers 102(1)-102(n) may be front end Web servers, application servers, and/or database servers. Such data includes, but is not limited to Web page(s), image(s) of physical objects, user account information, and any other objects and information. It should be noted that the servers 102(1)-102(n) may perform other tasks and provide other types of resources.

One or more servers 102 may comprise a cluster of a plurality of servers which are managed by a network traffic device such as a firewall, load balancer, web accelerator, gateway device, router, hub and the like. In an aspect, one or more servers 102(1)-102(n) may implement a version of Microsoft® IIS servers, RADIUS servers and/or Apache® servers, although other types of servers may be used and other types of applications may be available the on servers 102(1)-102(n). It should be noted that although the mobile client device, network management system, and/or server may be referred to herein in the plural, it is contemplated that only one mobile client device, one network management system, and/or one server may be considered without being limiting to the language used herein. It should be understood that the particular configuration of the system 100 shown in FIG. 1 are provided for exemplary purposes only and is thus not limiting.

Mobile client devices 106(1)-106(n) comprise computing devices capable of connecting to other computing devices, such as the servers 102(1)-102(n). Such connections are performed over wired and/or wireless networks, such as network 108, to send and receive data, such as SMS, MMS messages, Web-based and non Web-based requests, receiving responses to requests and/or performing other tasks, in accordance with the novel processes described herein. Non-limiting and non-exhausting examples of such mobile client devices 106(1)-106(n) include, but are not limited to, personal computers mobile phones and/or smart phones, pagers, tablet devices, PDAs and the like.

In an aspect, the mobile client devices 106(1)-106(n) are configured to send and receive messages using one or more message based services (e.g. text messaging, instant messaging, SMS or MMS messaging). In an aspect, the mobile client devices 106(1)-106(n) may be configured to run a Web browser or other software module that provides a user interface for human users to interact with and access the network management system 112 using a mobile application locally stored on the mobile device 106. In an example, the user can use the mobile client device 106 to request resources and/or information, as well as submit instructions over the network 108 to the network management system 112 via a message-based service. One or more Web-based or non Web-based applications may accordingly run on the mobile client device 106(1)-106(n) to receive instruction requests and/or perform requested instructions on behalf of a support personnel with the network management system 112.

The one or more short message service center (SMSC) components 110 are interposed between the network 108 and the mobile client devices 106(1)-106(n). The SMSC component 110 is a network device in the mobile telephone network 111 which receives and delivers mobile network-based messages (e.g. SMS, MMS) with regard to mobile client devices 106(1)-106(n). The SMSC component 110 handles messages sent and received between the network management system 112 and the mobile client devices 106(1)-106(n).

Network 108 comprises a publicly accessible network, such as the Internet, which handles communication between the mobile client devices 106(1)-106(n), the network management system 112 and the servers 102(1)-102(n) of the IT infrastructure 102'. However, it is contemplated that the network 108 may comprise other types of private and/or public networks. Communications between the mobile client devices 106(1)-106(n), the network management system 112 and the servers 102(1)-102(n) preferably take place over the network 108 according to standard messaging based services, such as text messaging, instant messaging, SMS and/or MMS as well as network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

LAN 104 may comprise one or more private and public networks which provide secured access between the network management system 112 and the servers 102(1)-102(n). These types of existing standardized messaging schemes used between financial institutions over WANs and LANs is well known and is not described in detail herein.

Figure 2A:
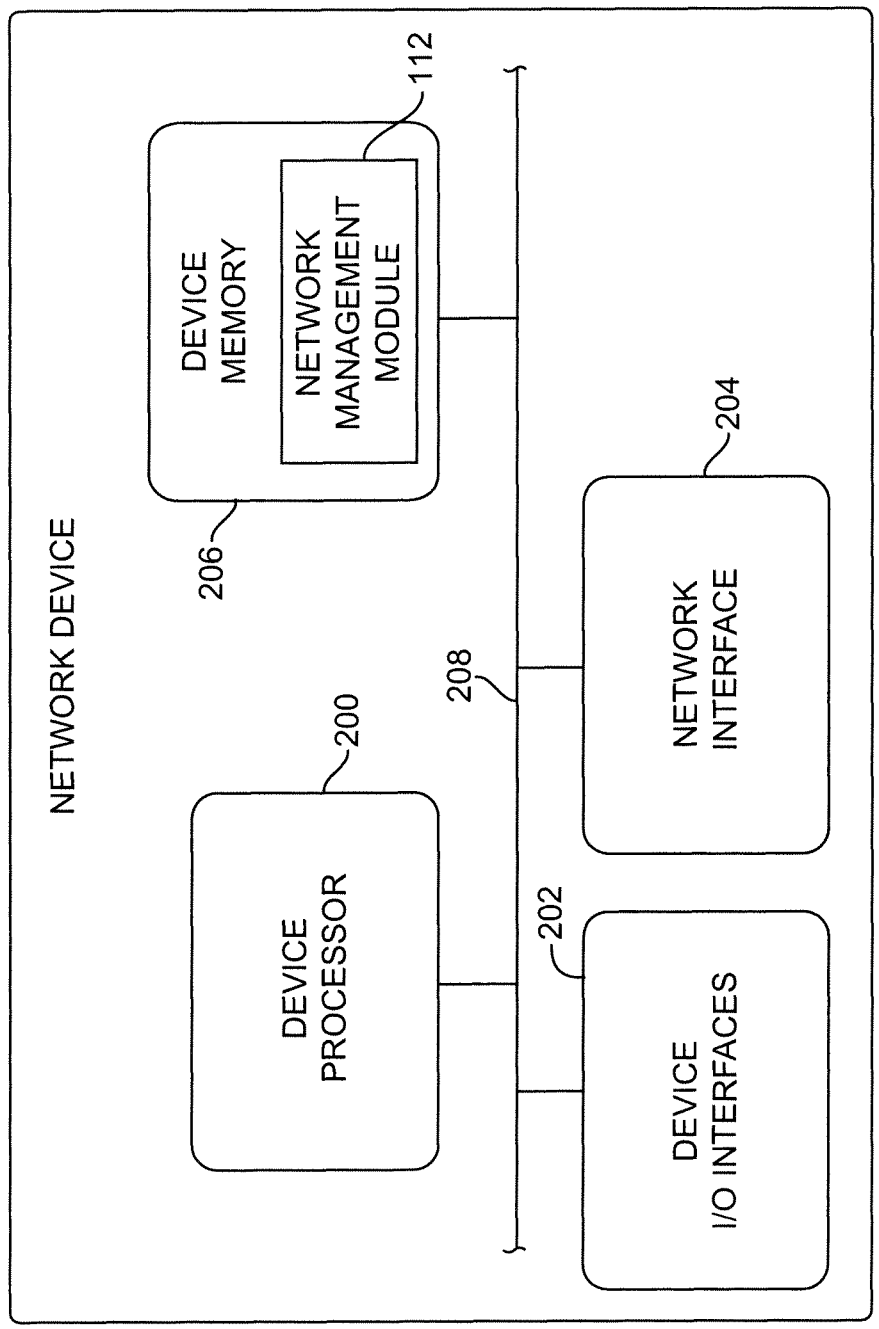
FIG. 2A illustrates a block diagram of a network device implementing at least a portion of a message-based network management system in accordance with an aspect of the present disclosure.

FIG. 2A illustrates a block diagram of a network device in accordance with an aspect of the present disclosure. With regard to FIG. 2A, the network management device may be one of a plurality of servers, a network management system, and/or a mobile client device 106. The network device includes one or more device processors 200, one or more device I/O interfaces 202, one or more network interfaces 204 and one or more device memories 206, all of which are coupled together by one or more buses 208. It should be noted that the network device 102 could include other types and numbers of components.

The network device shown in FIG. 2A may be a mobile client device and/or one or more physical or virtual servers which include at least a portion of the network management system 112. In the aspect that the network device is a mobile client device, the network management system 112 comprises the hardware and/or software portions which allow the support person using his/her mobile device to receive and transmit messages with a corresponding network management system 112 in a physical or virtual server. Where the network device is the mobile client device 106, a portion of the network management system 112 is an application module which stores machine readable code which, when executed by the processor on the device 106, causes the device 106 to run a mobile application which allows communication with the network management system 112.

Figure 3:
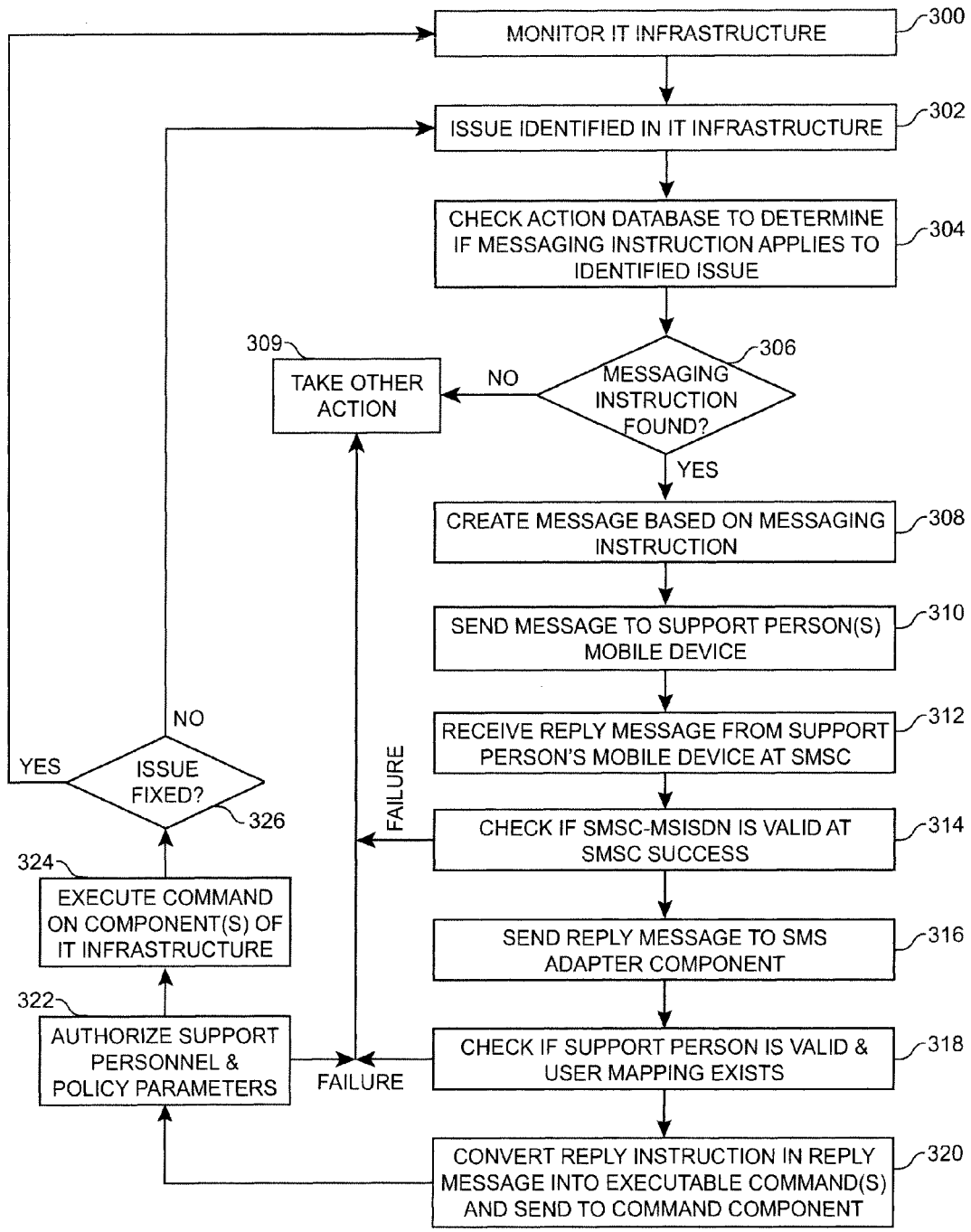
FIG. 3 illustrates an example flow chart diagram depicting at least a portion of a process performed by at least the message-based network management system in accordance with an aspect of the present disclosure.

In an aspect that the network device is a physical/virtual server, the network management system 112 comprises one or more physical and/or virtual machines which perform the process described in FIG. 3. Where the network management system 112 is the physical or virtual server, the system 112 many include software code implemented on a non-transitory computer readable storage medium, which when executed by one or more processors 200 in the network device, causes the processor 200 to perform the functions of the message-based management system described herein.

Device processor 200 comprises one or more microprocessors configured to execute computer/machine readable and executable instructions stored in the respective local device memory 206 or in a remote device memory (not shown). Such instructions are implemented by the processor 200 to perform one or more functions described below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured to execute the process in accordance with the teachings as described and illustrated herein of the novel system and method described below.

Device I/O interfaces 202 comprise one or more user input and output device interface mechanisms. The interface may include a computer keyboard, mobile device keypad, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204 comprises one or more mechanisms that enable the mobile client devices 106 and/or the servers 102 to engage in message-based communications, TCP/IP communications or other communications over the mobile network 111, LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as LAN 104, network 108, and mobile network 111.

In an example where the client device 106 and/or server 102 includes more than one device processor 200 (or a processor 200 has more than one core), each processor 200 (and/or core) may use the same single network interface 204 or a plurality of network interfaces 204 to communicate with other network devices. Further, the network interface 204 may include one or more physical ports, such as Ethernet ports, to couple its respective device with other network devices in the system 100. Moreover, the network interface 204 may include certain physical ports dedicated to receiving and/or transmitting certain types of network data, such as device management related data for configuring the respective device, and the like.

Bus 208 may comprise one or more internal device component communication buses, links, bridges and supporting components, such as bus controllers and/or arbiters. The bus enable the various components of the network device such as the processor 200, device I/O interfaces 202, network interface 204, and device memory 206, to communicate with one another. However, it is contemplated that the bus may enable one or more components of its respective network device to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network device which houses the bus.

Device memory 206 of the network device comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200. Such stored instructions allow the processor to perform actions, including implementing an operating system for controlling the general operation of the mobile client device 106, network management system 112 and/or server 102 to perform one or more portions of the novel process described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the network devices.

In general, a system and method for managing network infrastructure using a mobile device is disclosed. In general, the system and method utilizes a message-based network management system which monitors one or more hardware and/or software component in an IT infrastructure. The network management system alerts one or more support persons when an issue or problem occurs in the infrastructure by sending a message to the support person's mobile device. The network management system allows the support person to place one or more instructions to resolve the issue/problem via his/her mobile device, whereby the instructions are sent back to the network management system in the form of a reply message. The network management system is able to process the reply message and execute a command which corresponds to the support person's instructions to resolve the issue in the IT infrastructure. The advantages of the network management system serve a long felt need to reduce costs and achieve faster response times to address problems which occur in the IT infrastructure.

In particular to an aspect, the network management system uses SMS short codes to communicate with the support persons and manage the infrastructure. The network management system converts the SMS codes to commands using a java application which are then issued on the infrastructure using a command server. The network management system may employs multiple levels of security to allow specific users to run specific commands. Although the network management is configured to handle incident management, the system can be configured to allow the support person to issue commands which vary from a simple user creation to complex deployments. These issue commands are completely configurable by the administrator based on their requirements.

Figure 2B:
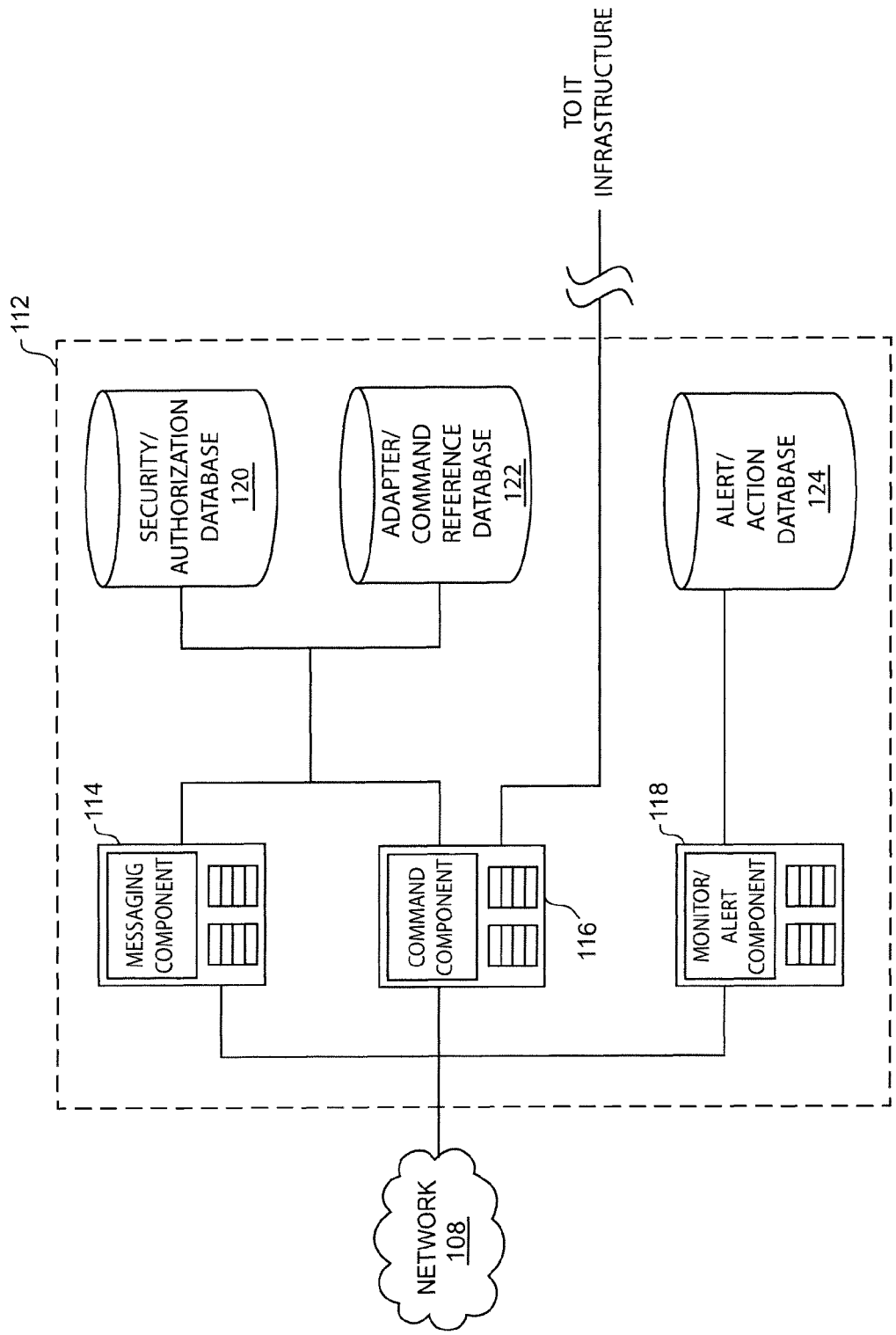
FIG. 2B illustrate a block diagram of the message-based network management system in accordance with an aspect of the present disclosure.

FIG. 2B illustrates a block diagram of a message-based network management system 112 in accordance with an aspect of the present disclosure. As shown in FIG. 2B, the message-based management system 112 includes a message adapter component 114, a command component 116 and a monitoring/alert component 118. Additionally, the message adapter component 114 and the command component 116 are configured to access and retrieve information from one or more security authorization databases 120 and one or more adapter/command reference databases 122. The monitor/alert component 118 is configured to access and retrieve information from one or more alert/action databases 124. It should be noted that although the message adapter component 114, command component 116 and monitoring/alert component 118 are shown in FIG. 2B as physical devices (e.g. servers), it is contemplated that one or more of these components may be software-based virtual machines that are implemented in a networking module housed on one server within the IT infrastructure or exterior to the IT infrastructure. The functions performed by the above components and databases are described below.

FIG. 3 illustrates a flow chart which represents at least a portion of the process in accordance with an aspect of the present disclosure. In particular, the process shown in FIG. 3 occurs where a hardware based and/or software based monitoring component 118 monitors one or more operating conditions of one or more physical and/or virtual machines 102(1)-102(n) in the IT infrastructure 102' (Block 300). Such operating conditions include, but are not limited to, CPU utilization, memory utilization, load balancing parameters, security breaches, filesystem capacity, application states, database states, any other documented error states logged in the operating system/database/application logs and the like.

This process continues until the monitoring component 118 identifies one or more issues or problems in one or more components and/or one or more services associated with the IT infrastructure. (Block 302). The specifics of how the monitoring component 118 monitors infrastructure component(s) are readily known in the art and thus are not discussed herein.

In particular to an aspect, the monitoring component 118 accesses one or more alert/action databases 124 (Block 304) and determines whether the identified issue(s) has a message alert instruction associated with it (Block 308). In a particular aspect, the monitoring component 118 determines whether the identified issue(s) has an SMS message alert instruction associated with it. If not, the monitoring component 118 is configured to take another action, such as notifying one or more support personnel by a non-messaging based technique (e.g. email, automated voice call), contacting a supervisor support person, contacting a network administration vendor, etc. (Block 309).

On the other hand, if a message alert instruction for the identified issue is found in the alert/action database 124, the monitoring component 118 retrieves the instruction and provides it to the command component 116. The message instruction will contain relevant information to allow the messaging component 114 to create and send one or more messages to one or more support persons identified in the message alert instruction. Such relevant information may include transit information associated with the sending and receiving of the message(s) between the management module and the mobile device (s) 106(1)-106(n). Such transit information may include, but is not limited to, the identity or identities of the support person(s) to be contacted, the mobile telephone number(s) of the support person(s) to contact; MSISDN information of the identified support person(s); authentication and authorization information for each identified support person(s); identity and responding information of the management module and the like.

Additionally, the instructions may include configuration data regarding the actual content of the message to be sent from the management module, including but not limited to, the form of the message to be sent to each identified support person(s) (e.g. SMS, instant chat; MMS); content of what the message should include; the identity of the identified issue(s) and the component(s) to which the issue pertains; specific information of the identified issue(s); specific information of the components in the infrastructure 102' affected by identified issue(s); general network operation and health of the components and/or infrastructure; one or more response instructions available to the support person(s) to effectively correct and/or resolve the issue(s) and the like. In an aspect, the organization can itself designate and provide the above information to be stored in the alert/action database 124, and is thus configurable based on the needs of the organization who's is attending to the IT infrastructure 102'.

The messaging component 114 thus processes the message instruction and creates one or more alert messages to send to the one or more identified support persons for handling of the identified issue(s) (Block 308). The messaging component 114 thereafter transmits the created alert message to the appropriate support person(s) (Block 310). In particular to an example, the messaging component 114 creates one or more SMS alert messages and sends the SMS alert message(s) to the mobile device(s) 106(1)-106(n) of the one or more identified support person(s) via the network 108 and mobile network 111.

The sent alert message(s) is handled via one or more intermediate mobile network devices, such as one or more SMSC components, to deliver the alert message(s) to the designated mobile device(s) 106(1)-106(n) of the identified support person(s). Once the alert message is received by the mobile device(s) 106(1)-106(n) of the one or more support person(s), the mobile device 106 processes the incoming alert message and displays it on its display for the support person to read. In an aspect, the incoming alert message provides general and/or specific information of the identified issue(s), the identity of the components in the infrastructure 102' affected by the issue(s), a snapshot of the overall health of the infrastructure 102' and/or specific components and any other information which the support person would need to handle and resolve the issue(s).

In an example, the alert message received at the mobile device 106 may appear such as:

"FILESYSTEM:/a/b/c on SERVER:123 is 99% FULL", process id 2313"; or

"CPU is 95% on SERVER 123, process id 2314".

The support person(s) simply replies to the alert message and inserts one or more alphanumeric codes into the body of the reply message, whereby the inserted code(s) correspond to one or more specific actions that the support person(s) orders to be executed by the network management system 112 to resolve the issue(s). As mentioned herein, the mobile device 106 may contain a web-browser based agent (e.g. "mobile application") which allows the user to place the reply message by simply selecting one or more displayed command provided by the mobile application. Once the user selects the one or more displayed commands, the mobile application will convert the command into a message form to be sent as a SMS or other message back to the network management system 112.

In association with the above example, the user can simply enter the following message in his/her mobile device 106, "EXEC CLNDSK 123 PROC 2313" to clean the memory cache in Server 123. In association with the second above example, the user can simply enter the following message in his/her mobile device 106, "EXEC KILL NON-CRIT PROC 2314" to free up the CPU capacity. As mentioned herein, the mobile device 106 may contain a mobile app which receives the alert message and converts into a readable form which is displayed on a web-browser on the mobile device 106.

In an example aspect, the incoming alert message may be configured to provide the support person with one or more available resolution actions from which he/she can choose to resolve the issue. The available resolution actions may be displayed in the form of an SMS message or may be processed by a mobile software application on the mobile device so that it is displayed in a web-browser on the mobile device 106. In this example aspect, the support person(s) can simply reply to the initially transmitted message by choosing one or more actions from a list of available actions and selecting the send or call button on the mobile device 106 to send the reply message back to the network management system 112.

Once the reply message is transmitted from the mobile device(s) 106(1)-106(n) back to the network management module 112, the message is received at a SMSC component 110 in the environment 100 (Block 312). The SMSC component 110 performs a first level security check on the message by accessing one or more internal and/or external databases (not shown) to determine if the MSISDN number of the reply message matches the MSISDN number of the support person authorized to send the reply message (Block 314). If the SMSC component 110 determines that the MSISDN number of the replying mobile device does not match any of the MSISDN numbers stored in the memory, the process fails and the management system 112 takes another action, as described above (Block 309).

On the other hand if the SMSC component 110 finds that the MSISDN number of the replying mobile device is found in the database, the SMSC component 110 forwards the reply message to the adapter component 114 of the network management system 112 (Block 316). Once the adapter component 114 receives the reply message, the messaging component 114 of the network management system 112 performs a second level of security by accessing the security authorization database 120 and checking if the replying mobile device is a valid mobile device in the security authorization database 120 (Block 318). If so, the messaging component 114 retrieves user mapping instructions from the adapter/command reference database 122, whereby mapping instructions provide necessary information allow the management system 112 to generate the appropriate executable command(s) to the IT infrastructure (Block 318). In particular, the command component 116 of the management system 112 processes the reply message, extracts the instructions from within the reply message, and generates one or more executable commands which corresponds to the instructions extracted from the reply message.

The command component 116 thereafter performs a third security process to determine if the command instructions that are generated from the reply message are authorized and within set policy parameters for the support person(s) who sent the reply message (Block 322). In particular, the command component 116 checks an AAA database or other equivalent database and compares the executable command(s) with the authorization and/or policy parameters granted to the support person(s) who gave the resolution instruction. The command component 116 may verify whether the support person has authorization and/or clearance to place such a command, whether the support person is authorized to access the one or more hardware components in the IT infrastructure; one or more user groups in the IT infrastructure and the like.

If the command component 116 determines that the executable command is not within the authorized policy parameters of the support person and/or the support person is not authorized to order that type of executable command, the management system 112 will take another action, as shown in Block 309, (e.g. not execute the command, contact the help desk). Otherwise, the command component 116 will execute the command(s) on the one or more IT infrastructure components in an attempt to resolve the issue (Block 324).

Once the command component 116 executes the one or more commands, the monitoring component 118 monitors the one or more IT infrastructure components to determine whether the issue or problem has been solved (Block 326). This may be done by monitoring operational conditions of one or more affected IT infrastructure components, network traffic metrics, data transfer rates and the like. If the monitoring component 118 determines that the issue remains and has not been resolved, the process repeats back to Block 302. Otherwise, the process repeats back to Block 300.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method of managing an IT infrastructure using a mobile device, the method comprising:

identifying, using one or more processors of a network management system, an issue in one or more affected components in the network infrastructure;

checking, using the one or more processors, when a message instruction in an action database is associated with the identified issue;

retrieving, using the one or more processors, the message instruction for the identified issue from the action database when the checking indicates the message instruction is in the action database, wherein the message instruction includes information identifying a support personnel and a mobile device of the support personnel to contact regarding the identified issue using a SMS messaging technique, and take another action to contact the support personnel regarding the identified issue using a non-SMS messaging technique when the checking indicates the message instruction is not in the action database;

sending, using the one or more processors, an alert message to the mobile device of the identified support personnel using the SMS messaging technique based on the retrieved message instruction, wherein the alert message contains information of the identified issue;

receiving, at the network management system, a reply message from the mobile device, wherein the reply message contains an instruction to resolve the identified issue;

generating, using the one or more processors, an executable command corresponding to the instruction in the reply message; and executing the executable command on the one or more affected components in the IT network infrastructure to resolve the identified issue.

2. The method of claim 1, wherein the alert message is routed through one or more SMSC components, wherein the method further comprises transmitting the alert message from the one or more SMSC components to the mobile device; and receiving the reply message from the replying mobile device at the one or more SMSC components, wherein the one or more SMSC components performs a first security check on the reply message to verify whether a MSISIDN address of the mobile device is in a set of accepted MSISIDN addresses stored on the one or more SMSC components;

sending the reply message from the one or more SMSC components to the network management system upon verifying the MSISDN address of the mobile device.

3. The method of claim 2, further comprising:

performing a second security check on the reply message at the network management system, wherein the second security check comprises verifying that the contact information of the mobile device matches the contact information of the identified support personnel.

4. The method of claim 3, further comprising:

performing a third security check on the reply message at the network management device, wherein the third security check comprises accessing authorization policy information of the identified support personnel and verifying that the instruction in the reply message complies with the authorization policy information of the identified support personnel.

5. The method of claim 1, wherein the mobile device includes a mobile application configured to communicate with the network management device, wherein the mobile application converts the alert message into form that allows the contents of the alert message to be displayable to the support personnel on the mobile device via a user interface.

6. The method of claim 1, further comprising determining whether the issue is resolved after executable command is executed; and sending another alert message to the one or more support personnel if the issue is not resolved.

7. A non-transitory machine readable storage medium having stored thereon instructions for managing an IT network infrastructure using a mobile device, comprising machine executable code which when executed by at least one machine, causes the machine to:

identify an issue in one or more affected components in the network infrastructure;

check when a message instruction in an action database is associated with the identified issue;

retrieve the message instruction for the identified issue from the action database when the check indicates the message instruction is in the action database, wherein the message instruction includes information identifying a support personnel and a mobile device of the support personnel to contact regarding the identified issue using a SMS messaging technique, and take another action to contact the support personnel regarding the identified issue using a non-SMS messaging technique when the checking indicates the message instruction is not in the action database;

send an alert message to the mobile device of the identified support personnel using the SMS messaging technique based on the retrieved message instruction, wherein the alert message contains information of the identified issue;

receive a reply message from the mobile device, wherein the reply message contains an instruction to resolve the identified issue;

generate an executable command corresponding to the instruction in the reply message; and execute the executable command on the one or more affected components in the IT network infrastructure to resolve the identified issue.

8. The machine readable storage medium of claim 7, wherein the message sent to the mobile device is routed through one or more SMSC components, the code configured to cause at least one machine on the one or more SMSC components to:

transmit the message from the one or more SMSC components to the mobile device;

receive the reply message from the replying mobile device at the one or more SMSC components;

perform a first security check on the reply message to verify whether a MSISDN address of the replying mobile device is in a set of accepted MSISDN addresses stored on the one or more SMSC components; and send the reply message from the one or more SMSC components to the network management device upon verifying the MSISDN address of the replying mobile device.

9. The machine readable storage medium of claim 8, wherein the code causes the machine to:

perform a second security check on the reply message, wherein the second security check comprises verifying that the contact information of the replying mobile device matches the contact information of the identified support personnel.

10. The machine readable storage medium of claim 9, wherein the code causes the machine to:

perform a third security check on the reply message, wherein the third security check comprises accessing policy information of the identified support personnel and verifying that the instruction in the reply message complies with the policy information of the identified support personnel.

11. The machine readable storage medium of claim 7, further comprising code configured to cause at least one machine on a mobile device to implement a mobile application configured to communicate with the machine on a network management device, wherein the mobile application converts the message into form that allows the contents of the alert message to be displayable to the support personnel on the mobile device via a user interface or SMS code.

12. The machine readable storage medium of claim 11, wherein the code causes the machine to:

determine whether the issue is resolved after executable command is executed; and send another alert message to the one or more support personnel if the issue is not resolved.

13. A network management system including at least one network management device comprising:

a network interface configured to allow communications with at least one database and at least one mobile network;

a memory having stored thereon executable code configured as instructions for managing an IT network infrastructure using a mobile device;

a processor coupled to the network interface and the memory, the processor operative to execute the executable code to:

identify an issue in one or more affected components in the network infrastructure;

check when a message instruction in an action database is associated with the identified issue;

retrieve the message instruction for the identified issue from the action database when the check indicates the message instruction is in the action database, wherein the message instruction includes information identifying a support personnel and a mobile device of the support personnel to contact regarding the identified issue using a SMS messaging technique, and take another action to contact the support personnel regarding the identified issue using a non-SMS messaging technique when the checking indicates the message instruction is not in the action database;

send an alert message to the mobile device of the identified support personnel using the SMS messaging technique based on the retrieved message instruction, wherein the alert message contains information of the identified issue;

receive a reply message from the mobile device, wherein the reply message contains instruction to resolve the identified issue;

generate an executable command corresponding to the instruction in the reply message; and execute the executable command on the one or more affected components in the IT network infrastructure to resolve the identified issue.

14. The network management system of claim 13, wherein the message sent to the mobile device is routed through one or more SMSC components, a processor of the one or more SMSC components implementing executable instructions in a SMSC memory wherein the processor of the one or more SMSC components is configured to:

transmit the message from the one or more SMSC components to the mobile device;

receive the reply message from the replying mobile device at the one or more SMSC components;

perform a first security check on the reply message to verify whether a MSISDN address of the replying mobile device is in a set of accepted MSISDN addresses stored on the one or more SMSC components; and send the reply message from the one or more SMSC components to the network management device upon verifying the MSISDN address of the replying mobile device.

15. The network management system of claim 14, wherein the processor of the network traffic management device is configured to perform a second security check on the reply message, wherein the second security check comprises verifying that the contact information of the replying mobile device matches the contact information of the identified support personnel.

16. The network management system of claim 15, wherein the processor of the network traffic management device is configured to perform a third security check on the reply message, wherein the third security check comprises accessing policy information of the identified support personnel and verifying that the instruction in the reply message complies with the policy information of the identified support personnel.

17. The network management system of claim 15, wherein the mobile device is configured to include a processor configured to implement executable instructions in a memory wherein the processor of implements a mobile application configured to communicate with the network management device, wherein the mobile application converts the message into form that allows the contents of the message to be displayable to the support personnel on the mobile device via a user interface or SMS code.

18. The network management system of claim 13, wherein the processor on the network management device is configured to:

determine whether the issue is resolved after executable command is executed; and send another message to the one or more support personnel if the issue is not resolved.

* * * * *